Jan. 7, 1964    E. S. GRIMMETT    3,116,980
PULSE COLUMN
Filed March 27, 1961
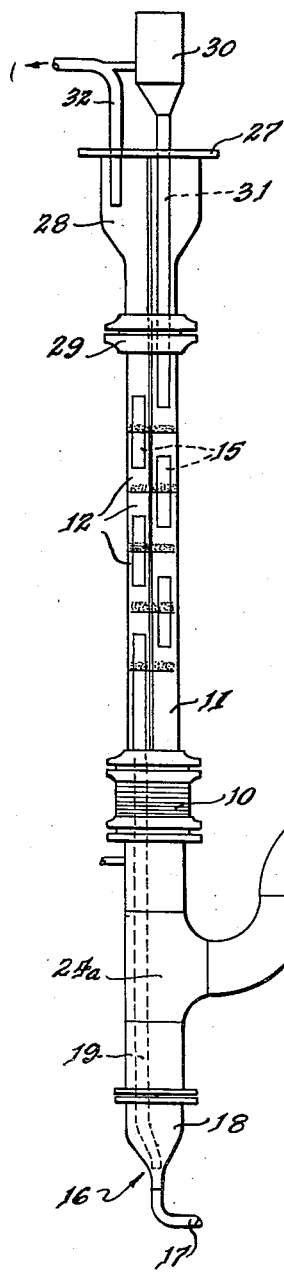
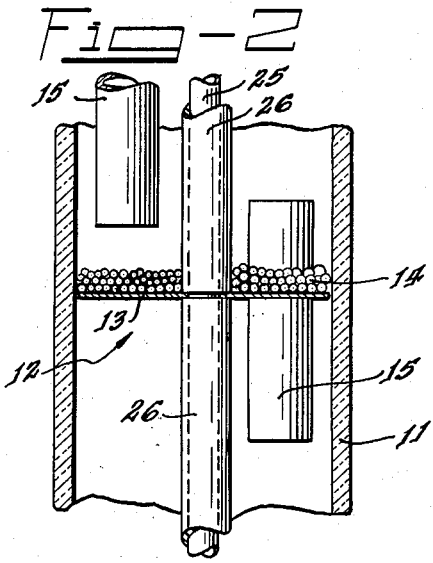
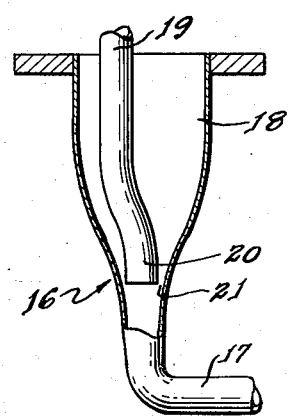
INVENTOR.
Earl S. Grimmett
BY
Roland G. Anderson
Attorney

United States Patent Office 3,116,980
Patented Jan. 7, 1964

3,116,980
PULSE COLUMN
Earl S. Grimmett, Idaho Falls, Idaho, assignor to the United States of America as represented by the United States Atomic Energy Commission
Filed Mar. 27, 1961, Ser. No. 98,724
2 Claims. (Cl. 23—270)

This invention relates to a continuous countercurrent liquid-solids contactor and more particularly to a solids discharger for such a contactor.

The advantages of this type of liquid-solids contactor column are well known and include noncyclic operation, constant concentration of effluent streams, continuous productive use of the column, and low solids inventory.

According to the present invention, a contactor column has a plurality of contactor stages each comprising a perforated plate, a layer of balls supported on the plate, and a downcomer tube extending through the plate, a liquid-pulsing piston, and a solids discharger comprising a conical section at the bottom of the column and a tubular extension on the lowest downcomer terminating in the conical section in spaced relation to the interior thereof. A small annular opening is formed between the downcomer extension and the conical section, and through this opening fall solids coming through the perforated plate of the lowest contactor stage. This annular opening is small enough that the pressure drop across the opening is greater than that upward through the perforated plate and layer of balls of the lowest stage.

In the drawings:

FIG. 1 is an elevation of the liquid-solids contactor column of the present invention;

FIG. 2 is a fragmentary sectional view of the solids discharger of the column forming the present invention; and FIG. 3 is a fragmentary sectional view of a contact stage of the column.

As shown in FIG. 1, a part of the column above a "Teflon" expansion joint 10 is constructed from a "Pyrex" glass pipe 11, of 2 inches inner diameter. Within the pipe 11 are five contact stages 12, each, as shown in FIG. 3, comprising a perforated plate 13, a layer 14 of stainless-steel balls carried thereby, and a downcomer pipe 15 extending through and secured to the plate 13. This plate extends in all directions across the pipe 11, is of stainless steel, and has 0.079-inch diameter holes, 83 per square inch on a square pitch. The plates 13 are 3½ inches apart. The layer 14 of balls is ¼ inch thick, and each ball is 3/32 inch in diameter. The balls of layer 14 provide a self-cleaning bed that permits the flow of liquid, but not of solids. This is most important, since extended operation is possible without clogging of the perforated plate 13 or of the layer 14 of balls. Each downcomer pipe 15 is welded to the associated plate 13 and is 7/16 inch in inner diameter and has its upper end somewhat higher than the lower end of the downcomer pipe 15 next above.

As shown in FIG. 1, solids pass out of the bottom of the column through a solids discharger 16 to a slurry-discharge line 17 of ½ inch inner diameter. The solids discharger 16 comprises a generally conical hollow stainless-steel section 18 and an extension 19 formed on the lower end of the lowest downcomer 15 and terminating in an offset portion 20 centered in spaced relation to the interior of the conical section 16 so that a narrow annular opening 21 is formed therebetween, which may, for example, have a width of 1/16 inch. This width is such as to allow any solids falling through the bottom perforated plate 13 to go into the slurry-discharge line 17, and yet to cause a greater pressure drop between the conical section 16 and the offset portion 20 of the extension 19 to occur upon pulsing of the liquid in the column than across the perforated plate 13 and layer of balls 14 of each contact stage 12. Thus liquid is pulsed upward through the contact stages 12.

The portions of the column between the expansion joint 10 and the solids discharger 16 are of stainless steel. Liquid in the column is pulsed by a pulser 22 having a stainless-steel piston 23 of 2 inches diameter driven by a variable-speed motor 24 through an adjustable crank arm so that the pulse amplitude may be varied from 0 to ½ inch and pulse frequency from 0 to 2000 cycles per minute. The pulser 22 is connected to the column by the branch of a pipe T 24a forming part of the column. The expansion joint 10 prevents vibrations produced by the pulser 22 from breaking the glass pipe 11.

The glass pipe 11 permits observation of the operation of the contact stages 12. As shown in FIG. 3, the perforated plates 13 are carried on a stainless-steel central rod 25 and stainless-steel tubular sections 26 embracing the rod and spacing the plates 13 3½ inches from one another. As shown in FIG. 1, the rod 25 is suspended from a stainless-steel cap 27 secured to the top of a tubular glass fitting 28 attached by a stainless-steel clamp 29 to the upper end of the pipe 11.

Above the cap 27 is a cup 30 into which solids are metered. From the bottom of the cup 30 a line 31 goes through the cap 27 and the fitting 28 into the pipe 11 so as to extend lower than the upper end of the downcomer pipe 15 of the top contact stage 12. A liquid-effluent line 32 extends through the cap 27 into the tubular section 28 and is hydraulically connectable to the cup 30 at various desired heights so that any desired liquid level can be maintained therein.

The column has been operated with pulse strokes up to ¼ inch and over frequencies of 150 to 800 cycles per minute. Over these operating ranges, solids in the form of $Al_2O_3$ oxide have been passed through the column at a maximum rate of 335 lbs./hr./ft.². Solution flow has ranged from 0 to 520 lbs./hr./ft.².

PROPERTIES OF SOLIDS USED IN LIQUID-SOLIDS CONTACTOR

Screen Analysis (Tylor) Percent by Weight

| | |
|---|---:|
| +14 | 0.3 |
| −14 +20 | 10.5 |
| −20 +28 | 23.0 |
| −28 +35 | 23.3 |
| −35 +60 | 28.9 |
| −60 +100 | 11.3 |
| −100 | 3.5 |

A number of leaching experiments have been made in this column. The results of three runs in which $Al_2O_3$, spiked with cesium ($Al_2O_3$ was prepared by fluidized bed calcination of simulated aluminum reactor fuel waste), was leached in this contactor as shown in the following table.

LEACHING RUNS USING ⅛-INCH STROKE LENGTH. 78° C. $H_2O$ LEACHING SOLUTION

Bulk Density of $Al_2O_3$=0.78 g./cc.

| $Al_2O_3$ Flow, cc./min. | Ratio of cc. $H_2O$/cc. $Al_2O_3$ | $Al_2O_3$ Retention Time, min. | Pulse Freq., Cycles/min. | Percent Cs Leached |
|---|---|---|---|---|
| 25 | 1.6:1 | 8.2 | 500 | 89.8 |
| 14.1 | 2.9:1 | 14.6 | 500 | 99.0 |
| 41.1 | 1.7:1 | 5.0 | 500 | 79.3 |

The concentration of cesium in the solid $Al_2O_3$ before leaching was about 0.2 mg. per gram, whereas after leaching, the concentration ranged from 0.001 to 0.05 mg. per gram. The concentration of the cesium in the effluent ranged from 0.02 to 0.05 mg. per ml.

Column operation was observed using bed depths of ¾ inch and 1½ inches for the solids on the layers 14 of balls. Better operation was obtained when using the deeper bed because severe bypassing of liquid and pulse energy through the downcomers was eliminated. This bed depth was therefore used in all of the capacity and efficiency runs.

Various ball packing depths were examined but large depths imposed too high a pressure drop across the stage, thus causing the liquid flow and hydraulic pulse to favor the downcomers. On the other hand, small depths imposed small pressure drops but allowed excessive shake-through of solids to the stage below thus reducing the effective solids column holdup time. A depth of ¼ inch proved to be satisfactory from both standpoints.

Stage downcomer seal depths of ⅛ inch and ¼ inch were investigated. The shorter depth allowed excessive flow of liquid and pulse through the downcomer instead of through the support plate; the larger depth provided good downcomer seal and was used in all of the subsequent capacity and efficiency runs.

The intention is to limit the invention only within the scope of the claims.

What is claimed is:

1. In a continuous countercurrent liquid-solids contactor comprising a pulse column and a plurality of vertically spaced contactor stages therein each consisting of a perforated plate, a downcomer tube extending therethrough, and a layer of balls carried on the plate, the diameter of the balls being somewhat larger than the diameter of the perforations in the plate, the combination therewith, of a hollow reduced section attached to the base of the column, an extension formed on the lower end of the downcomer tube of the bottom contactor stage and terminating in the hollow reduced section so as to form therewith a narrow annular opening, and a pulser connected to the column between the bottom perforated plate and the said narrow annular opening.

2. In a continuous countercurrent liquid-solids contactor comprising a pulse column and a plurality of vertically spaced contactor stages therein each consisting of a perforated plate, a downcomer tube extending therethrough, and a layer of balls carried on the plate, the diameter of the balls being somewhat larger than the diameter of the perforations in the plate, the combination therewith, of a generally conical hollow section attached to the base of the column, an extension formed on the lower end of the downcomer tube of the bottom contactor stage and terminating in the hollow conical section so as to form therewith a narrow annular opening, and a pulser connected to the column between the bottom perforated plate and the said narrow annular opening.

References Cited in the file of this patent
UNITED STATES PATENTS
2,872,296   Lemon et al. _____ Feb. 3, 1959

OTHER REFERENCES

Goldberger et al.: Indus. and Eng. Chem., page 641, vol. 51, No. 5 (May 1959).

Potnis et al.: Indus. and Eng. Chem., pages 645–650, vol. 51, No. 5 (May 1959).